(12) United States Patent
Chikoti et al.

(10) Patent No.: US 12,373,592 B2
(45) Date of Patent: Jul. 29, 2025

(54) SYSTEMS AND METHODS FOR AUTO DISCOVERY OF SENSITIVE DATA IN APPLICATIONS OR DATABASES USING METADATA VIA MACHINE LEARNING TECHNIQUES

(71) Applicant: JPMORGAN CHASE BANK, N.A., New York, NY (US)

(72) Inventors: Santosh Chikoti, Monroe Township, NJ (US); Jeffrey Kessler, Mahopac, NY (US); Ita B Lamont, North Brunswick, NJ (US); Saurabh Gupta, Secaucus, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 93 days.

(21) Appl. No.: 18/510,299

(22) Filed: Nov. 15, 2023

(65) Prior Publication Data

US 2024/0143820 A1 May 2, 2024

Related U.S. Application Data

(63) Continuation of application No. 17/462,983, filed on Aug. 31, 2021, now Pat. No. 11,899,807.
(Continued)

(51) Int. Cl.
*G06F 21/62* (2013.01)
*G06F 16/35* (2025.01)
(Continued)

(52) U.S. Cl.
CPC .......... *G06F 21/6218* (2013.01); *G06F 16/35* (2019.01); *G06F 16/383* (2019.01); *G06F 40/151* (2020.01)

(58) Field of Classification Search
CPC .......... G06F 16/35; G06F 17/18; G06F 16/27; G06F 40/151; G06F 16/383; G06F 21/6218; G06N 20/00
See application file for complete search history.

(56) References Cited

U.S. PATENT DOCUMENTS

| 2017/0228821 | A1  | 8/2017 | Reimer |
| 2020/0250139 | A1* | 8/2020 | Muffat ................. G06F 16/182 |

(Continued)

*Primary Examiner* — Mohammad A Siddiqi
(74) *Attorney, Agent, or Firm* — GREENBERG TRAURIG LLP

(57) ABSTRACT

A method for auto discovery of sensitive data may include: (1) receiving, at data enrichment computer program in a metadata processing pipeline, raw metadata from a plurality of different data sources; (2) enriching, by the data enrichment computer program, the raw metadata; (3) converting, by the data enrichment computer program, the raw metadata and the enhanced raw metadata into a sentence structure; (4) predicting, by a category prediction computer program in the metadata processing pipeline, a predicted category for the sentence structure; (5) identifying, by a sensitive data mapping computer program, a sensitive data category that is mapped to the predicted category based on a policy mapping rule; (6) determining, by the sensitive data mapping computer program, a risk classification rating for the predicted category; and (7) tagging, by the sensitive data mapping computer program, the data source associated with the metadata based on the risk classification rating.

20 Claims, 3 Drawing Sheets

Related U.S. Application Data

(60) Provisional application No. 63/073,572, filed on Sep. 2, 2020.

(51) Int. Cl.
  *G06F 16/383* (2019.01)
  *G06F 40/151* (2020.01)

(56) References Cited

U.S. PATENT DOCUMENTS

| | | |
|---|---|---|
| 2020/0294099 A1 | 9/2020 | Poirier et al. |
| 2021/0036995 A1 | 2/2021 | Guo et al. |
| 2021/0157990 A1* | 5/2021 | Lima ........................ H04L 51/02 |
| 2021/0249002 A1 | 8/2021 | Ahmadidaneshashtiani et al. |
| 2021/0258290 A1 | 8/2021 | Gupta et al. |
| 2021/0303638 A1* | 9/2021 | Zhong .................... G06F 40/169 |
| 2021/0390127 A1* | 12/2021 | Fox ........................ G06F 16/335 |
| 2022/0030030 A1 | 1/2022 | Sofer |
| 2023/0237276 A1* | 7/2023 | Lima ........................ G06F 40/35 |
| | | 704/9 |
| 2024/0386015 A1* | 11/2024 | Crabtree ............. G06F 16/9024 |

* cited by examiner

SYSTEMS AND METHODS FOR AUTO DISCOVERY OF SENSITIVE DATA IN APPLICATIONS OR DATABASES USING METADATA VIA MACHINE LEARNING TECHNIQUES

RELATED APPLICATIONS

This application is a Continuation of U.S. patent application Ser. No. 17/462,983, now U.S. Pat. No. 11,899,807, filed Aug. 30, 2021, which claims priority to, and the benefit of, U.S. Provisional Patent Application Ser. No. 63/073,572, filed Sep. 2, 2020, the disclosure of each of which is hereby incorporated, by reference, in its entirety.

BACKGROUND OF THE INVENTION

1. Field of the Invention

Embodiments are generally related to systems and methods for auto discovery of sensitive data in applications or databases using metadata via machine learning techniques.

2. Description of the Related Art

Large multi-national enterprises own a large number of applications and databases collected over the years through acquisition and driven by continuously changing business requirements. Each of these applications have been built using a highly optimized language tuned for the specific business problem they were created to solve. In the past, the user community of an application and dataset were known, and any ambiguity around data structures, sensitivity, and regulations were handled by the application developers.

In the past decade, there has been a heightened regulatory environment. Combined with data migrating to data lakes, clouds, and machine learning projects, there are many new stakeholders both inside and outside of the organization who need to understand data in order to make decisions. Some examples include: is any of the data in the dataset sensitive; where is data of a given type being produced and consumed; how is the data moving through the organization or out of the organization; does the organization maintain duplicates of the same data; is the data subject to legal hold or record retention regulations; how does the organization shed light on "dark pools" of data which could be critical to further business objectives; etc.

In the past, data profiling products have been used to reverse engineer data sets in order to document them for data sensitivity, regulatory asks, and for efficiency. The sheer volume of data involved makes this approach impractical for large organizations, as it is not unusual for there to be tens of thousands of databases representing petabytes of data. Using a deep profiling tool, it would take over a decade to comprehensively process this much data. Even worse, by the time the profiling exercise was complete, the underlying data would have changed to such an extent that the inventory would have little ongoing value.

Due to these challenges, organizations have relied on application owners to manually certify their data periodically from stored documentation, models, and source code. The challenges with the "manual method" are consistency, freshness, and compliance. It is risky to have many different application owners interpreting constantly changing privacy standards. In addition, application teams change and evolve over time, new members of the team may not even realize what they are certifying. Over time "dark pools" of data develop. Lastly, application teams are very busy solving business problems and may feel pressure to place compliance tasks onto the backlog.

SUMMARY OF THE INVENTION

Systems and methods for auto discovery of sensitive data in applications or databases using metadata via machine learning techniques are disclosed. In one embodiment, a method for auto discovery of sensitive data in applications or databases using metadata via machine learning techniques may include: (1) receiving, at data enrichment computer program in a metadata processing pipeline, raw metadata from a plurality of different data sources; (2) enriching, by the data enrichment computer program, the raw metadata; (3) converting, by the data enrichment computer program, the raw metadata and the enhanced raw metadata into a sentence structure; (4) predicting, by a category prediction computer program in the metadata processing pipeline, a predicted category for the sentence structure; (5) identifying, by a sensitive data mapping computer program, a sensitive data category that is mapped to the predicted category based on a policy mapping rule; (6) determining, by the sensitive data mapping computer program, a risk classification rating for the predicted category; and (7) tagging, by the sensitive data mapping computer program, the data source associated with the metadata based on the risk classification rating.

In one embodiment, the data source may be tagged with a highly confidential tag, a confidential tag, a private tag, or a public tag.

In one embodiment, one of the data sources may be a database, an application, etc.

In one embodiment, the sensitive data mapping computer program may look up the predicted category in a sensitive data category database.

In one embodiment, the sensitive data category database may be specific to an organization.

In one embodiment, the method may further include receiving, from a user interface, a query for a sensitive data classification; and returning, to the user interface, a result to the query.

In one embodiment, the method may further include combining, by the data enrichment computer program, the sentence structure with application data for the application.

In one embodiment, the category prediction computer program may include a trained model binary object, wherein the trained model binary object returns the predicted category for the sentence structure. The trained model binary object is trained with historical data using a supervised learning/training process.

According to another embodiment, a system may include a plurality of data sources comprising raw metadata; a metadata harvester that harvests the raw metadata from the plurality of data sources; a sensitive data database that maps categories of metadata to a sensitive data category; a metadata processing pipeline that receives the raw metadata from the data harvesters, comprising: a data enrichment computer program that is configured to enrich the raw metadata and covert the raw metadata and the enhanced raw metadata into a sentence structure; a category prediction computer program that is configured to predict a predicted category for the sentence structure; a sensitive data mapping computer program that is configured to identify a sensitive data category in the sensitive data database that is mapped to the predicted category based on a policy mapping rule, determine a risk classification rating for the predicted category, and tag the data source associated with the metadata based on the risk classification rating.

In one embodiment, the data source may be tagged with a highly confidential tag, a confidential tag, a private tag, or a public tag.

In one embodiment, wherein one of the data sources may be a database, an application, etc.

In one embodiment, the sensitive data mapping computer program may be further configured to look up the predicted category in a sensitive data category database.

In one embodiment, the sensitive data category database may be specific to an organization.

In one embodiment, the data enrichment computer program may be further configured to combine the sentence structure with application data for the application.

In one embodiment, the category prediction computer program may include a trained model binary object, wherein the trained model binary object may return the predicted category for the sentence structure. The trained model binary object may be trained with historical data using a supervised learning/training process.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for auto discovery of sensitive data in applications or databases using metadata via machine learning techniques. The sensitive data may include private information (PI).

To address the speed, scale, and scope issues described above, embodiments are directed to a human-readable dictionary of data in structured databases, such as relational database management systems (RDBMS), by collecting and processing metadata instead of profiling data values. Any database having a structured schema may be used. For example, embodiments may collect from schemas, tables, column names, and associated metadata including, for example, data types, and sizes, as well as similar data.

Benefits may include at least some of the following: (1) a substantially smaller dataset to work with (e.g., gigabytes instead of petabytes); (2) rapid collection of the entire estate allows frequent refreshes; and (3) small overhead on target data servers and minimal hardware in the central tool.

Embodiments make the following assumptions: (1) developers used some type of logic when naming database objects (e.g., relatively infrequent usage of object names like col1/col2), (2) data values in a column can be ambiguous—a column called "account" may hold multiple account number types which may look radically different (profilers relying on regular expression ("RegEx") rules get confused very quickly); (3) metadata labels concatenated together can be reliably parsed into standardized tokens (e.g., "acctno" may be expanded to "Account Numbers"); a parsing and abbreviation expansion step may be used; (4) while different development groups may call the same object different names, the names may be standardized into a canonical form as people do this every day in normal conversation (e.g., Client, Party, Customer, etc.); (5) issues like foreign languages, misspelling in metadata (e.g., different spellings for UK and US English) may be mitigated; (6) abbreviations may be expanded, and ambiguous abbreviations used in metadata labels may be resolved based on the context in which an element sits (e.g., 'CA_ID' column could mean 'Client Advisor ID' in one app and 'Client Associate ID' in another application)

Embodiments involve a data "pipeline" in which each step along the pipeline may apply specific NLP/Statistical or data techniques with the objective of preparing the data input set for the next step. The pipeline components may be de-coupled, recombined in different orders, etc. depending upon the input data or the specific use case.

Figure 1:
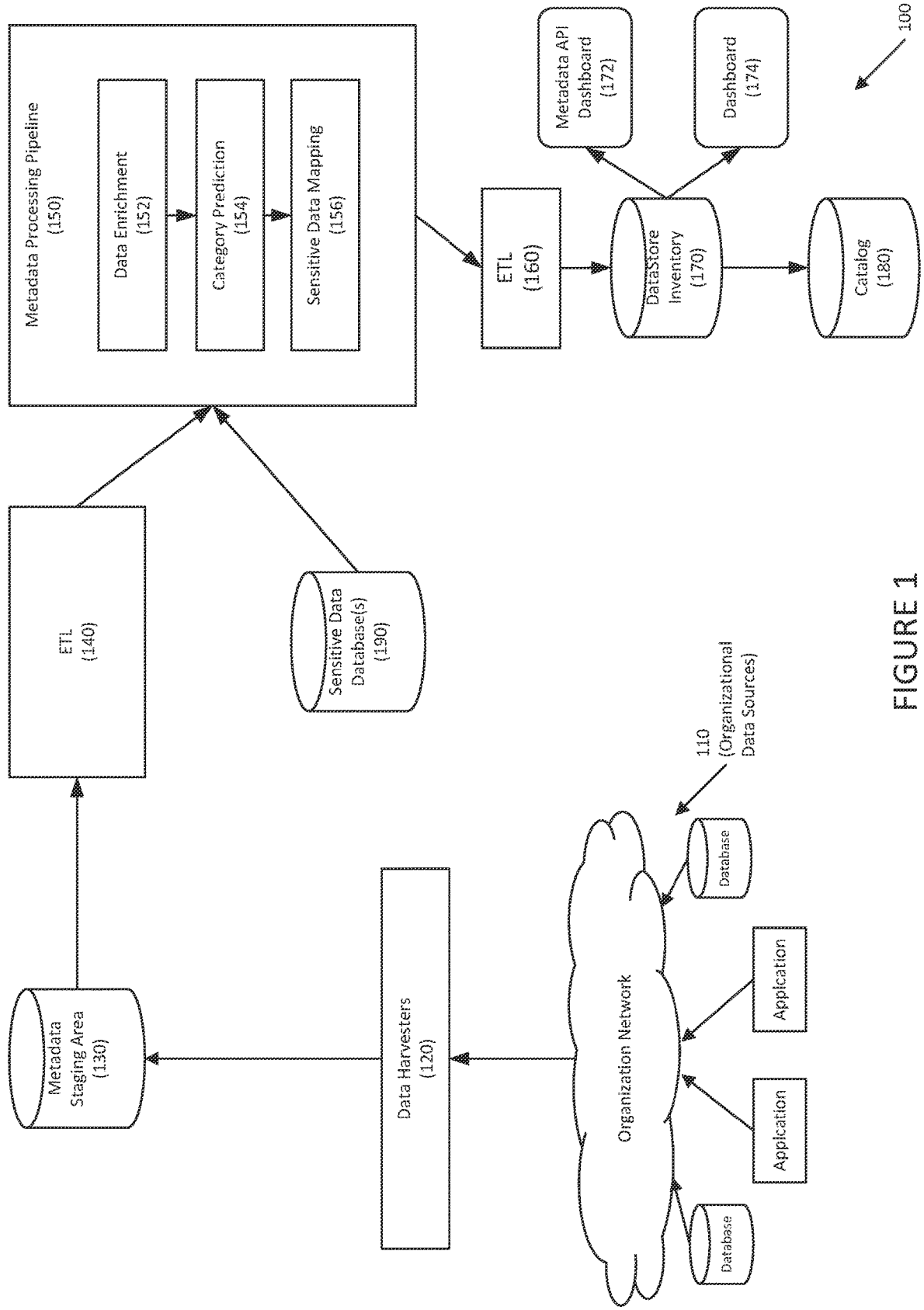
FIG. 1 depicts a system for auto discovery of sensitive data in applications or databases using metadata via machine learning techniques according to an embodiment.

Referring to FIG. 1, a system for auto discovery of sensitive data in applications or databases using metadata via machine learning techniques is disclosed according to an embodiment. System 100 may include organizational data sources 110, which may include target databases, restricted databases (e.g., databases in a DMZ), mainframe systems, applications, etc.

In one embodiment, organizational data sources 110 may use any suitable technology.

Data may be retrieved using appliances, which may include a schema crawler, etc.

In one embodiment, one or more data harvester 120 may make a direct connection to one or more organization data source 110 and may read the metadata using a specific API relevant to that database technology. In another embodiment, custom harvesters may be placed "close" to a database server to read metadata and forward asynchronously and out of band. This may be generally done where there are network impediments, such as firewalls. In another embodiment, a specialized harvester may read metadata prepared by applications in specific formats and delivered to the harvesting system via file transfer.

In another embodiment, a data store platform may expose an API that provides metadata to the data pipeline for processing. For example, in certain cases, the metadata cannot be read from the database, but a software product may expose an API that may facilitate data reading. Further, in virtualized and cloud-based systems, a single API endpoint may provide metadata for multiple individual data stores.

Metadata collected by data harvesters 120 may be stored in metadata staging area 130, where it may then optionally undergo ETL process 140 and may be ingested into metadata processing pipeline 150, which may be provided on a big data platform, such as Hadoop or similar. In another embodiment, the data may sit on a cloud provider.

In one embodiment, the metadata in metadata processing pipeline 150 may undergo data enrichment using data enrichment computer program or module 152, sensitive data prediction using category prediction computer program or module 154, and sensitive mapping using sensitive data mapping computer program or module 156. An example of data enrichment may include "Englishification" of the metadata, an example of which is disclosed in U.S. patent application Ser. No. 17/010,023, the disclosure of which is hereby incorporated, by reference, in its entirety. The "Englishification" process may propose a human readable "phrase" for every piece of physical metadata, including table and column names. This "Englishified" data may assist with understanding the data and may serve as an input into statistical machine learning models to classify for sensitive data, entity inventories, and many other use cases.

In one embodiment, category prediction computer program or module 154 may use a trained machine learning model to predict a category for the enriched metadata. Because legacy applications often have multiple schemas, tables without the logical data models, etc., it could take huge amount of manual processing along with long development/analysis time to ascertain whether an application database contains sensitive data. In embodiments, a machine learning-based NLP algorithm may predict a category for the enriched metadata.

Sensitive data mapping computer program or module 156 may take the category prediction from category prediction computer program or module 154 and may map it to one or more policy, such as an organizational policy, an industry-standard policy, etc. The one or more policy may be stored in policy database 190.

The output of metadata processing pipeline 150 may undergo second ETL process 160. For example, metadata may be consolidated down to a flattened "Besting Table" and pushed to Metadata API dashboard 172 and dashboard 174.

For example, after processing is complete, the metadata and enrichments (enrichment, sensitive data prediction, sensitive data mapping) may be represented as a flattened single table. This table may be ETL'd to a database, where the flattened "besting table" may be used for intelligence reports and analytics.

The flattened besting table may support a simplified intelligence and API distribution of the metadata and enrichments. Thus, metadata from varying database technologies is harmonized into a single representation. Effectively, the database technology is less important, as the actual structure of the data being discovered is important.

The data may be provided to downstream consumers of the data, such as datastore inventory 170 and catalog 180. The downstream consumers may provide corrections back to metadata processing pipeline 150 for further refinements of the model as is necessary and/or desired.

Embodiments may effectively reverse engineer the variation in the "language" of the organization. Language "dialects" at a large multi-unit organization may be consolidated into a standard language so that data can "interoperate" across different entities within the same organization.

Embodiments may also accelerate the integration of two merging organizations, an organization being acquired by another organization, etc.

Figure 2:
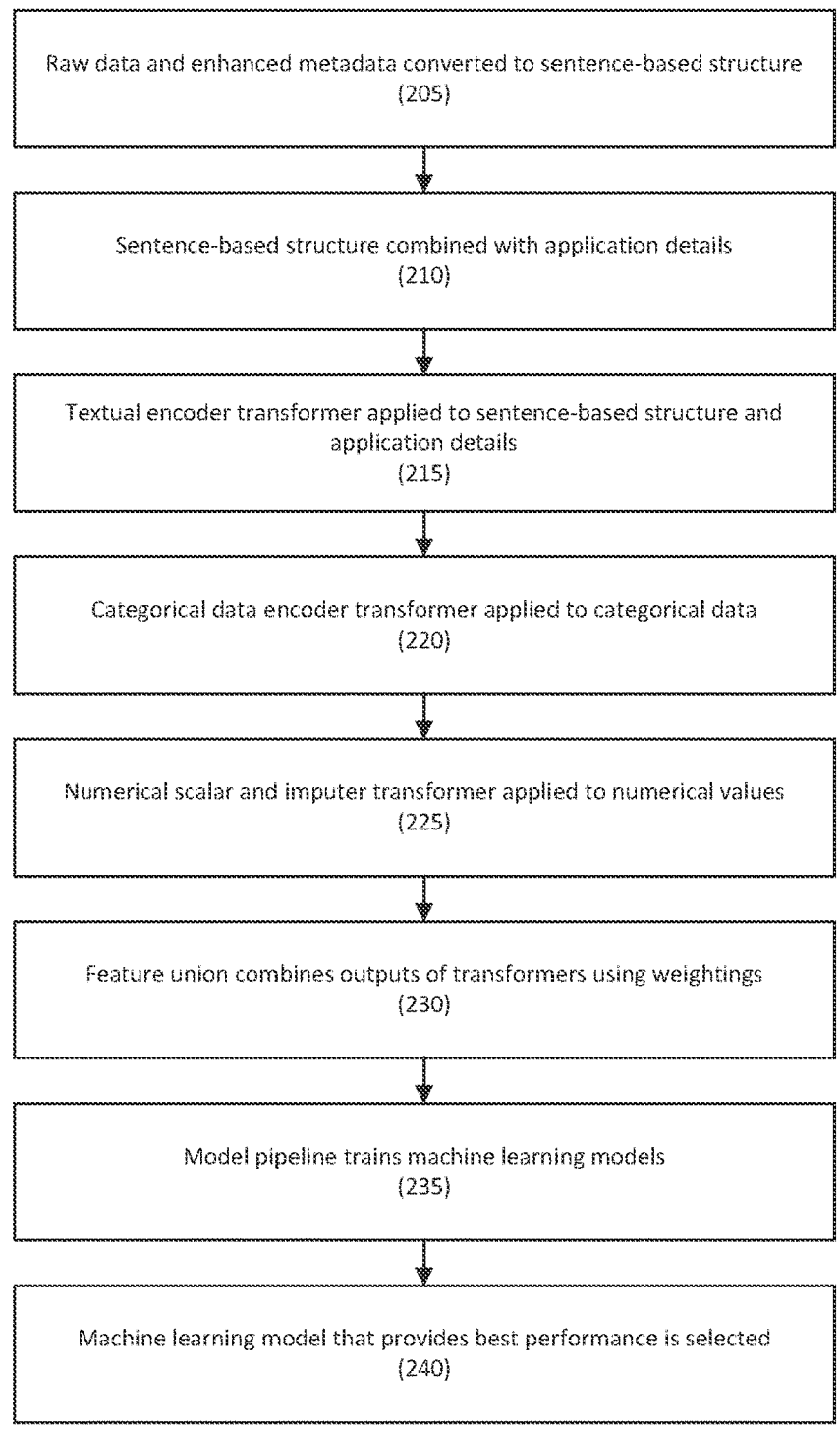
FIG. 2 illustrates a method for training a machine learning engine according to an embodiment.

Referring to FIG. 2, a method for training a machine learning engine is provided according to an embodiment. In one embodiment, training may include historic data that has been tagged by domain experts may be used in a supervised learning/training process. In another embodiment, the training data may be synthetic data. In still another embodiment, a combination of historic and synthetic data may be used.

In step 205, raw metadata from the training data and with enhanced metadata may be converted into the sentence structure. In embodiments, raw metadata may be enhanced using an "Englishification" process in which abbreviations may be expanded to their English meanings. Examples of the Englishification process are disclosed in U.S. patent application Ser. No. 17/010,023, filed Sep. 2, 2020, the disclosure of which, is hereby incorporated, by reference, in its entirety.

For each row in a table, the tabular structure may be converted into the sentence structure. For example, using the table below

| Application Name | Table Name | Column Name | Column Type |
|---|---|---|---|
| Example App | ABC | Fname | Varchar |
|  | ABC | Lname | Varchar |
|  | ABC | Age | Int | each row may be converted into a sentence. For row 1, "Example App ABC Fname Varchar," for row 2, "Example App ABC Lname Varchar," for row 3 "Example App ABC Age Int." The sentence structure is used to apply NLP techniques to understand the language of the data and to apply the machine learning models.

In step 210, the sentence-based structure of metadata may be combined with application details. In one embodiment, the application details may include the application name, application description, organization unit, etc. The application details may be used to extract the context for the category prediction and also for sensitive data mapping.

In one embodiment, the physical database/schema may be used, it may or may not be associated to an application. For example, the application name and application description may assist in classifying a date column in a table as a system date, a person date of birth, etc. System age may not be a sensitive data element, whereas a person's date of birth combined with other columns like first name, last name may be considered to be sensitive data.

For example, application name and application description are separate, and the application may include a physical datastore with metadata, or may not have to datastore/metadata.

In step 215, a textual encoder transformer may be applied. The textual encoder transformer may take the text data (i.e., the sentence-based structure and the application details) as an input and may convert the text data into numerical vectors. For example, term frequency-inverse document frequency (TF-IDF) may be used to vectorize the sentence structure.

In step 220, a categorical data encoder transformer may be applied. The categorical data encoder transformer may take the categorical data as an input and may convert it into an encoded representation. In one embodiment, a one-hot encoding technique may be used. For example, column data type is one of the categorical variables with multiple categories like VARCHAR, DATETIME, INT, NUMBER, etc. For example, each category type maybe a column, and it may be encoded as a 1 or 0 depending on whether or not it applies to the row. An example table is below:

| Row | DateTime | VarChar | INT |
|---|---|---|---|
| Row 1 | 1 | 0 | 0 |
| Row 2 | 0 | 1 | 0 |
| Row 3 | 0 | 0 | 1 |

In step 225, a numerical scalar and imputer transformer may be applied. The numerical scalar and imputer transformer may scale the numerical values may be scaled to an appropriate scale using a standard scalar with median impute process. For example, column data size is an example of a numerical variable. A median imputer with group by logic may be used to impute/replace the missing values with a derived number.

In step 230, the outputs of three transformers—the textual encoder transformer, the categorical data encoder transformer, and the numerical scalar and imputer transformer—may be combined using a feature union. The feature union may assign a weight to each of the three transformers and for each application metadata of the input metadata. For example, a frequentist approach may be used, in which the frequency probabilities of columns (n grams), tables (n grams) along with column data types may be extracted. This may be used to ascertain the composition of weights for each of the transformer and for each application.

For example, an application may apply a weighting of 0.23 to the output of the categorical encoder, a weighting of 0.38 to the output of the numerical transformer, and 0.39 to the output of the text vectorizers. As another example, another application may assign a weighting of 0.1 to the output of the categorical encoder, a weighting of 0.25 to the output of the numerical encoder, and a weighting of 0.65 to the output of the textual vectorizers.

The weightings may be adjusted manually, based on machine learning, etc.

In step 235, a model pipeline may train a plurality of machine learning models in a model pipeline and may output the model performance based upon on the train-test data splits (e.g., 75 training data and 25 testing data). For example, the model pipeline may include three machine learning techniques for now—Stochastic Gradient Descent (SGD) Classifier, Naïve Bayes, and Multilayer Perceptron (MLP) Classifier. Additional and/or different machine learning techniques may be used as is necessary and/or desired.

In step 240, the machine learning model that provides the best performance may be selected. The performance of the models using the train test data split along with 10-fold cross validation in order eliminate the bias and variance may be measured. The performance metrics, such as F1 Score, Coverage/Support, Precision, Recall, etc. may be used to select the best model.

The output of the model pipeline is a mathematical equation saved as a trained model binary object in order to predict the data category for every new metadata input. For example, each new piece of metadata may be first be prepared to pass it on the binary object for the prediction.

Figure 3:
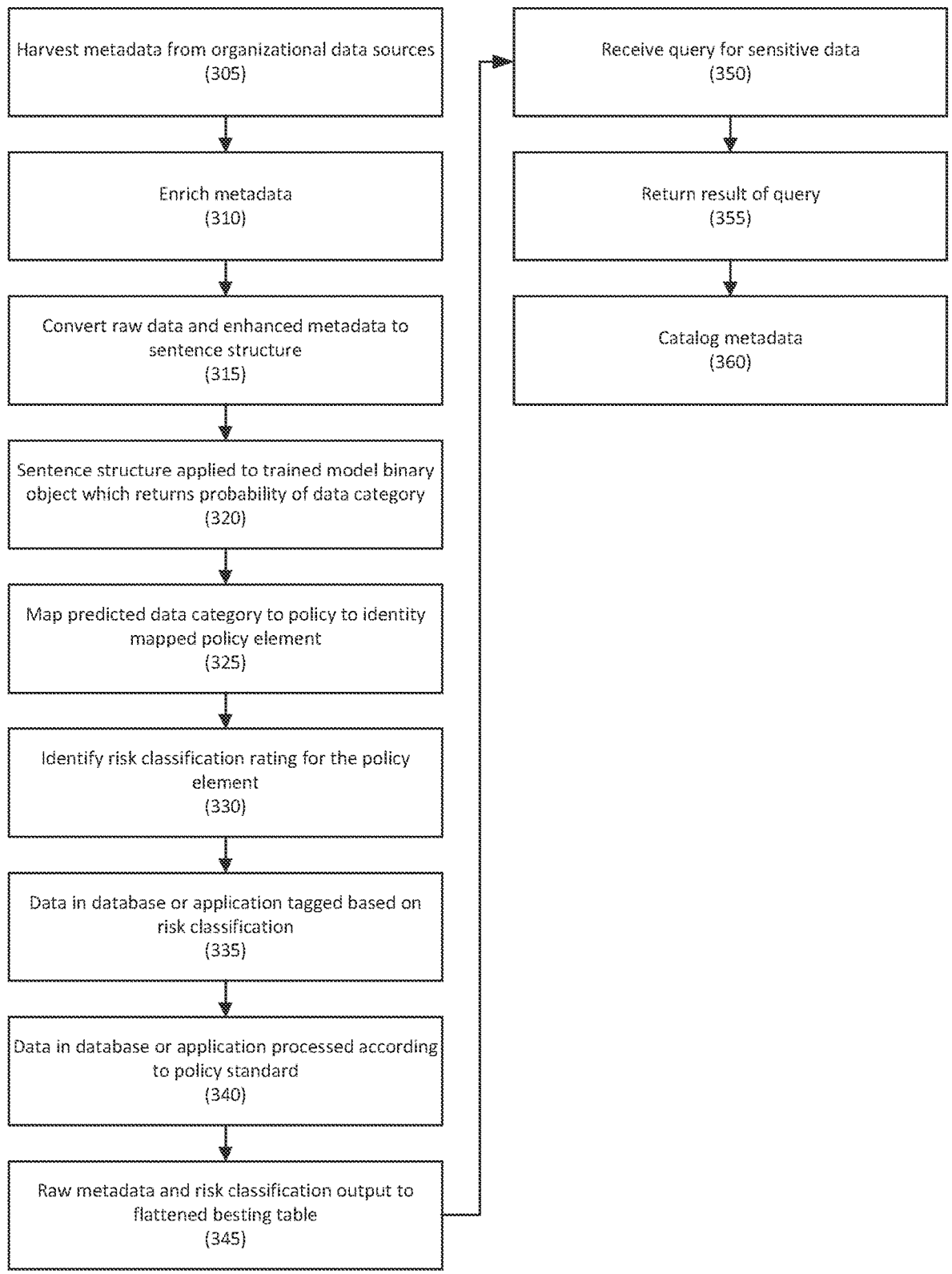
FIG. 3 illustrates a method for auto discovery of sensitive data in applications or databases using metadata via machine learning techniques according to an embodiment.

Referring to FIG. 3, a method for auto discovery of sensitive data in applications or databases using metadata via machine learning techniques is disclosed according to an embodiment.

In step 305, metadata may be harvested from one or more organizational data source. In one embodiment, data harvesters may be collected the metadata and may store the metadata in a plurality of caches or databases. In one embodiment, the metadata may be collected from many differing database technologies. The data may be stored in one or more staging areas and harmonized (e.g., all metadata may be confirmed to a single data model) while being ETL'd to a metadata processing pipeline.

In one embodiment, the data may be harmonized first and then transferred, or it may be harmonized while being transferred.

In step 310, the metadata may be enriched by a data enrichment computer program or module. For example, the metadata may undergo an "Englishification" process in which abbreviations may be expanded to their English meanings. Examples of the Englishification process are disclosed in U.S. patent application Ser. No. 17/010,023, filed Sep. 2, 2020, the disclosure of which, is hereby incorporated, by reference, in its entirety.

In step 315, the raw metadata and enhanced metadata may be converted into the sentence structure. This may be similar to step 205, above.

In step 320, the sentence structure may be provided to the trained model binary object, which returns a probability of a data category.

In step 325, the predicted data category may be mapped using policy mapping rules. The policy may be an organizational policy, an industry-standard policy, combinations, etc. This mapping may result in an additional enrichment column that identifies the mapped policy element. Examples of policy elements may include person name, account name, credit card number, PIN, address, customer identifier, data of birth, social security number, etc.

In step 330, a risk classification rating may be identified for the policy elements. For example, each policy element may be associated with a risk classification, such as confidential, highly confidential, internal, public, etc.

In step 335, the database or application associated with the metadata may be tagged based on the risk classification.

In step 340, the data in the database or application may be processed according to a policy standard. For example, data in a tagged database may not be uploaded to the cloud, may be encrypted, may require authorization to be accessed, etc.

In step 345, the raw metadata and risk classification may be output to a flattened besting table for reporting and API integration.

In embodiments, data discovery may be performed on the metadata. For example, in step 350, a query may be received for the metadata. For example, the query may be received at a dashboard, and a query API may be provided on top of the besting table to allow searching and querying the metadata and enrichments.

In step 355, a search engine may query the database and the results of the PI prediction and PI mapping, and may return the results.

In step 360, the metadata may be cataloged. In one embodiment, the catalog may provide human feedback to the ML engine, which will iteratively improve the prediction results.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for training a machine learning engine, comprising: converting, by a computer program, raw metadata from training data into a sentence structure;
applying a textual encoder transformer to the sentence structure that converts the sentence structure into numerical vectors;
applying a categorical data encoder transformer to the sentence structure that coverts categorical data of the sentence structure into an encoded representation;
applying a numerical scalar and imputer transformer to the sentence structure that scales numerical values in the sentence structure based on a scale;
combining outputs of the textual encoder transformer, the categorical data encoder transformer, and the numerical scalar and imputer transformer using a feature union that assigns a weight to each of the textual encoder transformer, the categorical data encoder transformer, and the numerical scalar and imputer transformer and for each application metadata of the raw metadata;
training a plurality of machine learning models in a model pipeline;
selecting the machine learning model out of the plurality of machine learning models based on a performance metric.

2. The method of claim 1, wherein the training data comprises historic data that has been tagged by domain experts.

3. The method of claim 1, wherein the training data comprises synthetic data.

4. The method of claim 1, further comprising:
expanding abbreviations in the raw metadata to their meanings.

5. The method of claim 1, further comprising:
combining, the sentence structure with application details for a source application.

6. The method of claim 5, wherein the application details comprise an application name and/or an application description.

7. The method of claim 1, wherein the weights are based on a frequentist approach that assigns the weights based on frequency probabilities.

8. The method of claim 1, wherein the plurality of machine learning models comprise a Stochastic Gradient Descent Classifier and a Naïve Bayes, and Multilayer Perceptron (MLP) Classifier.

9. The method of claim 1, wherein the performance metric comprises a F1 score, coverage/support, precision, and/or recall.

10. The method of claim 1, further comprising:
predicting, by the selected machine learning model a category for a new metadata input.

11. A non-transitory computer readable storage medium, including instructions stored thereon, which when read and executed by one or more computer processors, cause the one or more computer processors to perform steps comprising:
converting raw metadata from training data into a sentence structure;
applying a textual encoder transformer to the sentence structure that converts the sentence structure into numerical vectors;
applying a categorical data encoder transformer to the sentence structure that coverts categorical data of the sentence structure into an encoded representation;
applying a numerical scalar and imputer transformer to the sentence structure that scales numerical values in the sentence structure based on a scale;
combining outputs of the textual encoder transformer, the categorical data encoder transformer, and the numerical scalar and imputer transformer using a feature union that assigns a weight to each of the textual encoder transformer, the categorical data encoder transformer, and the numerical scalar and imputer transformer and for each application metadata of the raw metadata;

training a plurality of machine learning models in a model pipeline;

selecting the machine learning model out of the plurality of machine learning models based on a performance metric.

12. The non-transitory computer readable storage medium of claim 11, wherein the training data comprises historic data that has been tagged by domain experts.

13. The non-transitory computer readable storage medium of claim 11, wherein the training data comprises synthetic data.

14. The non-transitory computer readable storage medium of claim 11, further including instructions stored thereon, which when read and executed by one or more computer processors, cause the one or more computer processors to perform steps comprising:

expanding abbreviations in the raw metadata to their meanings.

15. The non-transitory computer readable storage medium of claim 11, including instructions stored thereon, which when read and executed by one or more computer processors, cause the one or more computer processors to perform steps comprising:

combining, the sentence structure with application details for a source application.

16. The non-transitory computer readable storage medium of claim 15, wherein the application details comprise an application name and/or an application description.

17. The non-transitory computer readable storage medium of claim 11, wherein the weights are based on a frequentist approach that assigns the weights based on frequency probabilities.

18. The non-transitory computer readable storage medium of claim 11, wherein the plurality of machine learning models comprise a Stochastic Gradient Descent Classifier and a Naïve Bayes, and Multilayer Perceptron (MLP) Classifier.

19. The non-transitory computer readable storage medium of claim 11, wherein the performance metric comprises a F1 score, coverage/support, precision, and/or recall.

20. The non-transitory computer readable storage medium of claim 11, including instructions stored thereon, which when read and executed by one or more computer processors, cause the one or more computer processors to perform steps comprising:

predicting, by the selected machine learning model a category for a new metadata input.

* * * * *